(12) United States Patent
Van Heijningen

(10) Patent No.: US 10,919,288 B2
(45) Date of Patent: Feb. 16, 2021

(54) METHOD OF PRODUCING A MULTILAYERED PRODUCT

(71) Applicant: PROCRAFT DEVELOPMENT BV, Alphen a/d Rijn (NL)

(72) Inventor: Dirk Jan Van Heijningen, Alphen a/d Rijn (NL)

(73) Assignee: PROCRAFT DEVELOPMENT BV, Alphen a/d Rijn (NL)

( * ) Notice: Subject to any disclaimer, the term of this patent is extended or adjusted under 35 U.S.C. 154(b) by 276 days.

(21) Appl. No.: 16/040,713

(22) Filed: Jul. 20, 2018

(65) Prior Publication Data
US 2020/0023633 A1    Jan. 23, 2020

(51) Int. Cl.
| | | |
|---|---|---|
| *B41C 1/14* | (2006.01) |
| *B41N 1/24* | (2006.01) |
| *B41M 3/12* | (2006.01) |
| *C09D 5/00* | (2006.01) |
| *C09D 183/04* | (2006.01) |
| *C09D 11/107* | (2014.01) |
| *C09D 11/101* | (2014.01) |
| *C09D 11/0235* | (2014.01) |
| *C09J 123/08* | (2006.01) |
| *C09J 133/06* | (2006.01) |
| *C09J 133/14* | (2006.01) |
| *C09J 11/04* | (2006.01) |
| *C09D 11/037* | (2014.01) |

(52) U.S. Cl.
CPC ............ *B41C 1/147* (2013.01); *B41M 3/12* (2013.01); *B41N 1/245* (2013.01); *C09D 5/008* (2013.01); *C09D 11/0235* (2013.01); *C09D 11/037* (2013.01); *C09D 11/101* (2013.01); *C09D 11/107* (2013.01); *C09D 183/04* (2013.01); *C09J 11/04* (2013.01); *C09J 123/0853* (2013.01); *C09J 133/06* (2013.01); *C09J 133/14* (2013.01)

(58) Field of Classification Search
None
See application file for complete search history.

(56) References Cited

U.S. PATENT DOCUMENTS 6,143,407 A    11/2000   Lythgoe et al.
6,541,561 B1    4/2003   Lythgoe
(Continued)

*Primary Examiner* — Joshua D Zimmerman
(74) *Attorney, Agent, or Firm* — Moser Taboada

(57) ABSTRACT

In embodiments, the present invention relates to a method of producing a multilayered printed item, comprising: (a) providing a coating of curable composition comprising a polymer powder, at least one plasticizer, and at least one monomer and/or oligomer, onto the substrate or a thereon previously applied layer or coating; (b) heating the curable coating composition to a temperature of about 70-120° C., to provide a gelled curable coating; (c) providing a coating of curable composition comprising a polymer powder, at least one plasticizer, and at least one monomer and/or oligomer, onto the previously applied layer or coating; (d) heating the other curable as above, to provide second gelled curable coating; (e) before crosslinking is performed, the multilayer-coated substrate formed is heated to a temperature of about 130-160° C.; and (f) crosslinking the heated multilayer-coated substrate, by irradiation and/or subjection to heat at a temperature of about 165-190° C.

23 Claims, 1 Drawing Sheet

(56) References Cited

U.S. PATENT DOCUMENTS

| | | | |
|---|---|---|---|
| 8,871,249 B2* | 10/2014 | Yamamoto | A61K 31/4985 424/448 |
| 2014/0096905 A1* | 4/2014 | van Heijningen | B05C 17/06 156/289 |

* cited by examiner

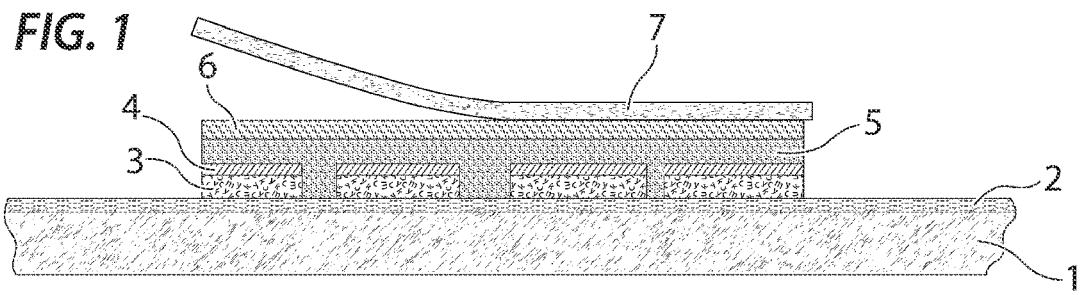
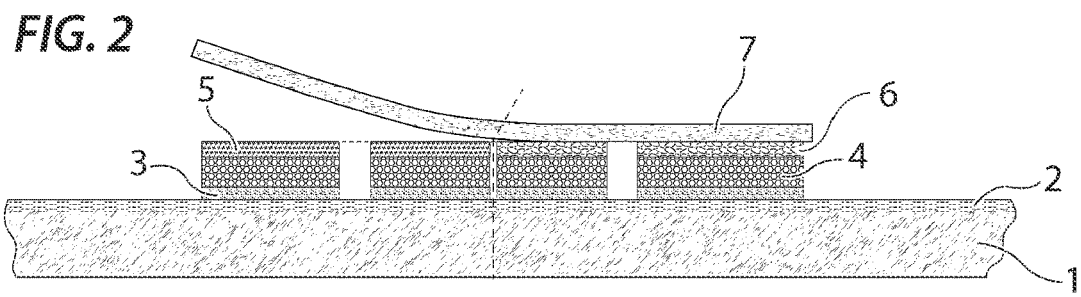
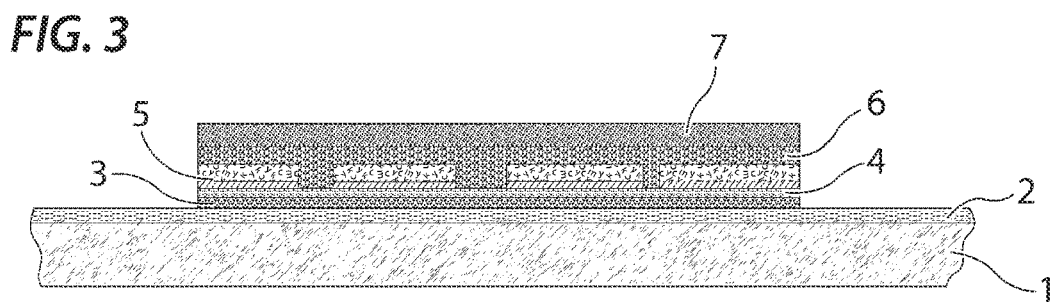
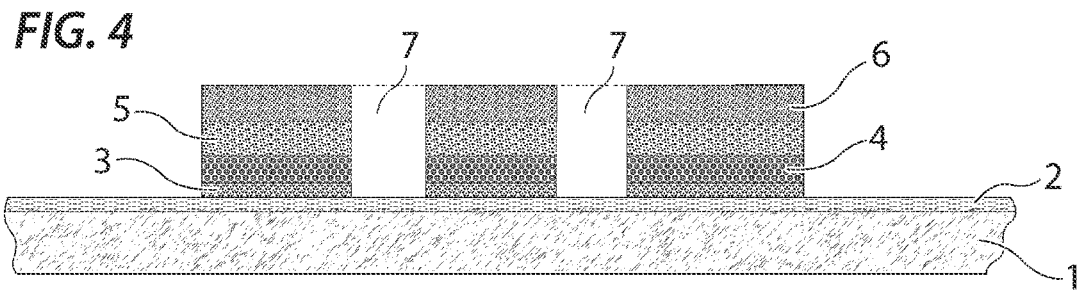
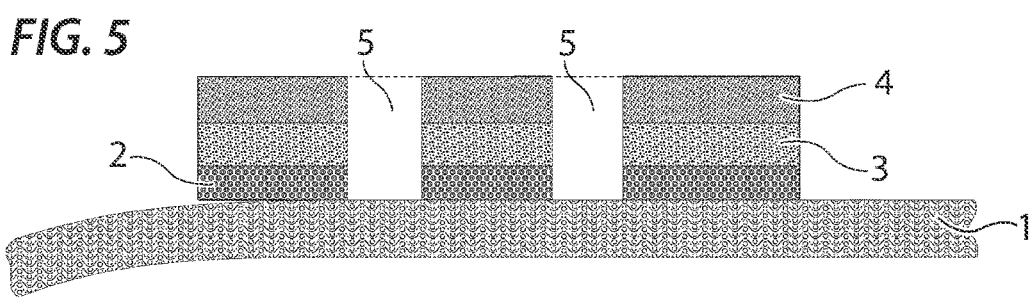

METHOD OF PRODUCING A MULTILAYERED PRODUCT

FIELD OF THE INVENTION

The present invention relates to a method of producing a multilayered printed indicia or stencil.

BACKGROUND

Printed indicia and stencils are commonly used materials to decorate or mark different articles. However, today such materials may have drawbacks such as inferior adhesion, interlayer cohesion and migration of volatile compounds, which may be shown as shrinkage, curling edges, and leaving residue on the applied surfaces, like wall paint, paper or glass after removal. Another phenomenon appearing upon removal is tearing into small pieces, and layers splitting up.

U.S. Pat. No. 6,541,561 discloses a method of preparing a plastic film or transfer.

U.S. Pat. No. 6,143,407 discloses a decalcamania comprising plastisol ink, a carrier sheat, and an adhesive.

There is a need to provide new materials and new methods of manufacture to overcome the above mentioned problems.

SUMMARY

The present invention provides ways to overcome cohesion and/or adhesion problems, and provides long-term strength and endurance during usage. Further, the present invention provides sustainable solutions by e.g. allowing recycling, and preventing volatile losses of components such as plasticizers and solvents. Also, polymer powders not containing halogens may be used to provide an environmentally friendly alternative.

The present invention provides layers which are gelled after application in order for the plasticizer/monomer/oligomer mixture to be absorbed in the polymer powder to avoid premature polymer curing. By the present gelling step, a good interlayer penetration and homogenization of the layers is provided. The interlayer diffusion provides a good interlayer cohesion during the crosslinking of all printed layers, including applied inks and pressure sensitive adhesives.

In embodiments, the present invention relates to a method of producing a multilayered printed indicia or stencil, comprising the steps of: (1) optionally providing a release coating on a substrate; (2) optionally providing a printing ink layer onto said release coating; (3) providing a coating of a curable composition comprising a polymer powder, at least one plasticizer, and at least one monomer and/or oligomer, onto the substrate or a thereon previously applied layer or coating; (4) heating the curable coating composition to a temperature of about 70-about 120° C., to provide a gelled curable coating; (5) optionally providing a printing ink layer onto said gelled polymer coating, (6) providing a coating of another curable composition comprising a polymer powder, at least one plasticizer, and at least one monomer and/or oligomer, onto the previously applied layer or coating; and heating the other curable composition coating to a temperature of about 70-about 120° C., to provide second gelled curable coating; (7) before crosslinking is performed, the multilayer-coated substrate formed is heated to a temperature of about 130-about 160° C.; and (8) crosslinking the heated multilayer-coated substrate, by irradiation and/or subjection to heat at a temperature of about 165-about 190° C.; wherein optionally a pressure sensitive adhesive composition coating is provided to the release coating on the substrate before further coatings are applied, or is provided to the gelled polymer coating which was last formed, if more than one is present.

BRIEF DESCRIPTION OF THE DRAWINGS

Embodiments of the invention will now be described, by way of example, with reference to the accompanying schematic drawings.

FIG. 1 illustrates a crosscut view of a decorative wall transfer disclosing different layers thereof.

FIG. 2 illustrates a crosscut view of a weather resistant sign transfer disclosing different layers thereof.

FIG. 3 illustrates a crosscut view of a peel-off decal graphics disclosing different layers thereof.

FIG. 4 illustrates a crosscut view of a flexible stencil mask disclosing different layers thereof.

FIG. 5 illustrates a crosscut view of a decorative stencil mask disclosing different layers thereof.

DETAILED DESCRIPTION

The present method of producing a multilayered printed indicia or stencil, can comprise several steps. Firstly, a substrate is provided. The substrate may be a plastic film, e.g. a polyethylene terephthalate film, or a polyoxythylene oxyterephthaloyl film; or a temperature resistant paper or cardboard, which may be stabilized with polymers; or a glass fiber material, such as a web or sheet. For non-adhesive stencils, reusable glass-fiber PTFE coated material such as a sheet or web can be used.

A release coating may be formed on the substrate, such as coated thereon. The substrate may be temporarily attached to the present multilayered printed indicia or stencil, indicating that upon usage of the multilayered printed indicia or stencil, the substrate may be released from the layered structure and applied onto e.g. a wall. A release coating may be applied on the substrate with controlled surface tension to obtain the correct application release levels and avoiding pre-release. The controlled surface tension of the substrate may be a surface tension in the range of 5 to 45 Dyne/cm, such as 10-40, 15-35, or 12-38 Dyne/cm. The release coating may comprise polydimethylsiloxane, epoxy resin, and polytetrafluoroethylene surface tension modifiers to obtain the correct release levels and avoiding pre-release.

Thereafter, a printing ink or adhesive, which is discussed more below, may be optionally applied onto said release coating or onto any other layer applied onto said release coating before this one, to provide a printing ink or adhesive layer. The printing ink may be selected from conventional, UV or hybrid offset and screen inks, flexographic and digital inks. It is to be noted that one or more types of printing inks could be used to provide this printing ink layer. The printing inks may contain different colorants to provide different colors of the printing ink layer. If a printing ink is not used at this stage, it may be applied later in the multilayering sequence, if used at all.

Onto the substrate, or optionally after the release coating, or optionally after the selected printing ink layer, or optionally after a pressure sensitive adhesive composition coating, as disclosed below, a coating of a curable composition comprising a polymer powder, at least one plasticizer, and at least one monomer and/or oligomer, is applied onto the substrate or any previous coating or layer, applied thereon. The curable coating may comprise initiators such as, photoinitiators which may be activated by e.g. UV, or thermally activated initiators, e.g. organic peroxides. The applied curable coating composition is heated to a temperature of 70-120° C., such as 70-110° C., 75-100° C. or 80-90° C., to provide a gelled curable coating. The heating is performed so that the polymer powder particles, which are present in a liquid mixture of said plasticizer, monomers and/or oligomers will be allowed to swell by absorbing part of the liquid mixture, which will provide a tack-free gelled structure to allow mutual penetration for inter-layer cohesion.

Optionally, e.g. if not provided previously, a printing ink may be applied onto said gelled polymer coating to provide a printing ink layer. The same types of printing inks as previously mentioned above could be considered for this application. If more than one printing ink layer is provided in the present multilayered printed indicia or stencil, the printing inks need not be identical, they may be of different types and colors. It is to be noted that if this optional printing ink layer is provided by one of the group conventional, UV or hybrid offset and screen inks, flexographic and digital inks, the previous printing ink layer, if present, may be provided by a different type of ink selected from the same group.

Another curable coating composition comprising a polymer powder, at least one plasticizer, and at least one monomer and/or oligomer, may be applied onto the previous coating or layer, e.g. the first gelled curable coating or the printing ink layer, or optionally a pressure sensitive adhesive coating composition, as disclosed below. If a printing ink layer is provided at this stage, it is preferable that said printing ink layer is followed by a layer of another curable coating composition. The same or similar coating composition as disclosed for the first curable coating composition may be used here. There may be differences between the curable compositions disclosed herein but they will be within the same scope as mentioned herein above in the previous disclosure of a coating of a curable composition. After coating application heating of the other curable coating composition is performed similar to the previous curable coating composition, i.e. to a temperature of 70-120° C., such as 70-110°, 75-100° C. or 80-90° C., to provide another, a second, gelled curable coating. Additional same or similar curable coatings composition may be applied in a similar manner so that a third or fourth coating may be provided with heating after each coating application or formation step. It is preferred that in some part of the layer provision sequence at least two curable coating compositions comprising a polymer powder, at least one plasticizer, and at least one monomer and/or oligomer are applied sequentially, directly following each other. In another embodiment, at least three curable coating compositions comprising a polymer powder, at least one plasticizer, and at least one monomer and/or oligomer are applied sequentially, directly following each other.

After provision of a preferred amount of gelled curable coating(s), the partially finished multilayer-coated substrate proceeds to the next step. Before crosslinking is performed, the multilayer-coated substrate formed is heated to a temperature of 130-160° C., such as 140-160° C. The further heating of the multilayer-coated substrate will allow the swollen polymer powder particles to dissolve into the mixture of plasticizer, monomer and/or oligomer, to form a homogeneous phase. It is to be noted that at this stage components of the different layers applied to the substrate further interconnect with each other by migration of components, which increases interlayer bonding upon the subsequent fixation. By this additional heating step to a higher temperature interlayer adhesion and cohesion is improved. The ratio between polymer powder particles and the liquid mixture of plasticizer, monomer and/or oligomer may be chosen in such way that there is no surplus of liquid or polymer, which would render the cooled down coating moist initially and/or brittle at a later stage.

After the additional heating step, crosslinking of the heated multilayer-coated substrate is performed by irradiation and/or subjection to heat at a temperature of 165-190° C., such as 170-180° C. The crosslinking may be provided through for example cationic polymerization or free radical polymerization. Irradiation may be performed for example by UV, and/or EB, which provides formation of an intrinsic network of the components of the multilayer-coated substrate. The radiant energy may be 5-500 mJ/cm$^2$, such as 20-500 mJ/cm$^2$, 100-450 mJ/cm$^2$, or 200-400 mJ/cm$^2$. Irradiation using wavelengths of about 300-500 nm, such as 350-450 nm, or 370-400 nm, may be performed. Crosslinking in the sense of chemical crosslinking forming chemical bonds between molecules is done at this stage of the formation of said multilayered printed indicia or stencil. The previous gelling and further heating is to provide a physical dissolution of components in each other, avoiding functionally significant crosslinking. This final chemical crosslinking gives the composition of layers its ultimate strength. This chemical crosslinking can be done by cationic or radical polymerization requiring their specific initiators. To provide crosslinking heating may need to be performed, e.g. by IR, or other conventional heating means to polymerize the multilayer-coated substrate comprising mixtures of polymers, monomer and/or oligomers to form an intrinsic network and render it thermohardened. Heating is important in order to crosslink using thermal initiators, e.g. organic peroxides, to provide free radical polymerization to crosslink ingoing components of the multilayered printed indicia or stencil. The crosslinking is performed after application of all curable composition coatings suitable for a specific type of product. By subjection to heat and/or UV/EB irradiation, a solid coating with desirable physicochemical and mechanical properties is formed. It is to be noted that when electron beam (EB) irradiation is used, initiators are not necessary in the compositions to be cured as the compositions are able to crosslink by EB radiation alone. However, initiators may be present in said compositions even if EB radiation is used. On cooling the completed multilayer-coated substrate is solid with excellent mechanical properties and without migration nor evaporation of the included plasticizer. Because of this and the strongly improved mechanical properties adhesion failure at the edges will have disappeared. The plasticizer will no longer evaporate or in case of a wall transfer migrate into the wall, such that there is no significant change in dimension, loss of adhesion at the edges, or discoloration of the wall after removal of an indicia or stencil.

It is to be noted that a pressure sensitive adhesive composition coating may be provided either to the release coating on the substrate before further coatings or layers are applied, or may be provided to the gelled polymer coating which was last provided, if more than one is present, before the additional heating and crosslinking is performed.

The present multilayered printed indicia or stencil comprises (1) at least a substrate, and (2) at least two, such as three, or more curable coating compositions comprising a polymer powder, at least one plasticizer, and at least one monomer and/or oligomer, which may comprise different components in the different coating layers. Optional layers of the multilayered printed indicia or stencil may be selected from the group consisting of a release coating, which may be applied onto the substrate before additional coatings or layers are applied; a pressure sensitive adhesive composition coating, which may be applied either directly on a release coating or on top of a final curable composition coatings comprising a polymer powder, at least one plasticizer, and at least one monomer and/or oligomer, before the final heating and curing steps; and a printing ink layer, which may be applied onto the release coating, when present, before additional coatings or layers are applied, or onto a curable composition coatings comprising a polymer powder, at least one plasticizer, and at least one monomer and/or oligomer, preferably the printing ink layer is applied in between two curable coating compositions comprising a polymer powder, at least one plasticizer, and at least one monomer and/or oligomer, respectively. If a pressure sensitive adhesive coating composition is applied at the end of the preparation of the multilayered printed indicia or stencil a protective foil may be applied thereon. The protective foil may be made of paper, plastics, or any combination thereof.

The different compositions may be provided as coatings or layers by printing or coating processes. As mentioned above, after a curable composition has been provided as a coating, it is subjected to an increased temperature to allow the polymer powder particles to swell by the partial penetration of the liquid mixture of the plasticizers, and monomers and/or oligomers. This swelling changes the coating into a non-tacky gel, which allows for multiple printing, i.e. printing of multiple layers, without back trapping. In the production of a multilayered printed indicia or stencil the provision of the different coatings and layers may be expressed as printing, i.e. the different coatings and layers have been printed to provide said multilayered printed indicia or stencil. After finishing printing (coating) the multiple-layer coated substrate, it is subjected to a further increase in temperature. During this process the swollen polymer powder particles will dissolve in the plasticizer, monomer and/or oligomer composition to form a homogeneous layered structure. Subsequently, at this higher temperature the coating is crosslinked e.g. by being subjected to UV and/or EB irradiation, or the temperature is further increased to polymerize the multiple-layer coated substrate for example with organic peroxide, to form an intrinsic network throughout multiple layers to enhance the mechanical properties significantly. The changes during the various steps can be described as a so called sol-gel transformation process. The "sol" being the dispersed polymer powder in the liquid mixture where type of polymer(s) and type of liquid components, and the "gel" phase being the swelling of the polymer particles by the liquid components till finally completely homogeneous structure is achieved having the requested dimensional and mechanical properties.

It is to be noted that as several layers of printing ink and curable composition coating comprising a polymer powder may be used in the provision of the multilayered printed indicia or stencil it is important to consider if UV curing is performed during the coating and layer build-up. If UV curing is used during the build-up of the layered structure any curable coating compositions comprising a polymer powder underneath such a UV cured layer would also be influenced and the multilayered printed indicia or stencil may have issues with bad adhesion between layers of the multilayered printed indicia or stencil. Thus, it is important that if UV is not only used at the end of the layer build-up only but also during the build-up, any provided curable coating compositions comprising a polymer powder should not include UV initiators but instead use other crosslinking initiators such as thermal initiators (e.g. organic peroxide) to avoid premature crosslinking of curable composition coatings comprising a polymer powder positioned beneath a layer being propulsive UV treated. Alternatively, printing ink layer(s) which may be present and/or curable coating compositions comprising a polymer powder may comprise formulations comprising high amounts of pigments, such as white pigments, e.g. titanium dioxide, which pigments makes it difficult for any UV radiation to penetrate through or into such a layer to cure and crosslink said layer or any underlying curable coating compositions comprising a polymer powder. If curable composition coatings comprising a polymer powder are highly pigmented and/or are covered by highly pigmented printing inks, such curable coating compositions comprising a polymer powder are preferably comprising thermal initiators such as organic peroxide to provide sufficient crosslinking via heating as disclosed above as subjection to UV would not be sufficient to crosslink, even if the coating composition in such a case would contain UV initiators, the curable coatings compositions comprising a polymer powder including high pigment amounts and/or being covered by highly pigmented printing ink, as the UV would not be able to penetrate into or through the highly pigmented formulations.

Herein is provided a curable coating composition comprising a polymer powder, at least one plasticizer, and at least one monomer and/or oligomer.

The composition may further comprise components selected from the group initiators, dyes, pigments, stabilizers, and fillers. The curable coating composition is provided by admixing the components, which composition is thereafter used in the present process to provide a coating. At least one curable composition is used in the production of the present multilayer-coated substrate.

The present curable coating composition may comprise:
30-75 wt % polymer powder(s),
5-50 wt % plasticizer(s),
1-40 wt % wt % monomer(s) and/or oligomer(s),
0.5-5 wt % initiator(s).

Any further components composition may be present in an amount of:
0.5-20 wt % dye(s) and/or pigment(s),
0.5-5 wt % stabilizer(s), and
0.5-5 wt % filler(s).

Polymer powder particles present in the curable coating composition are preferably insoluble in the mixture of monomer/oligomer and plasticizer at ambient temperatures, but will form a tack free gel when heated. Thus, allowing the present multilayer printing.

The polymer powder is preferably selected from acrylate polymers and/or vinyl polymers. Vinyl polymers may be selected from the group polyvinyl chloride, polyvinyl acetate, and copolymers of vinyl chloride and vinyl acetate. Acrylate polymers may be homopolymers and/or copolymers of $C_{3-25}$ alkyl acrylates and/or $C_{2-25}$ alkyl methacrylates. Acrylate polymers may be homopolymers and/or copolymers, which may originate from the group consisting of alkyl (meth)acrylate; hydroxyalkyl(meth)acrylate, wherein alkyl the previous compounds may be methyl, ethyl, butyl, 2-ethylhexyl, lauryl, stearyl, etc.; (meth)acrylic acid; maleic acid; itaconic acid; and any combination thereof.

The polymer powder may contain further polymers such as polystyrene, polyvinyl alcohol, polyacrylonitril, acrylonitrile butadiene styrene, and polyethylene terephthalate copolymers any combination thereof.

The polymer powder may be present in the curable coating composition in an amount of 30-75 wt %, such as 35-70 wt %, 40-68 wt %, 40-66 wt %, 35-66 wt %, 35-50 wt %, 40-50 wt %, 45-75 wt %, 50-70 wt %, or 55-68 wt %. The amount of polymer powder present may vary with type of polymer powder used. For example, if an acrylate polymer powder is used, it may be present in an amount of 35-66 wt %, such as 35-50 wt %, or 40-50 wt %; and if a vinyl polymer powder is used, it may be present in an amount of 45-75 wt %, such as 50-70 wt %, or 55-68 wt %.

The at least one plasticizer present in the curable coating composition is preferably at least two plasticizers. The plasticizers are preferably phthalate free. The plasticizers may be selected from the group consisting of polyglycol benzoate, such as polyoxyethylene glycol dibenzoate, polyoxypropylene glycol dibenzoate; trimellitate; pyromellitic acid ester; phosphates, such as tributyl phosphate, tricresyl phosphate, trixylene phosphate, trixylyl phosphate; adipates, such as dioctyl adipate, diisodecyl adipate; sebacates, such as dibutyl sebacate and dioctyl sebacate; hydrocarbons, such as alkyl-substituted diphenyl, alkyl-substituted terphenyl, partially hydrogenated alkyl terphenyl, aromatic processed oil, pine oil, etc; and any combination thereof.

The plasticizer(s) may be present in the curable coating composition in an amount of 5-50 wt %, such as 10-45 wt %, 15-40 wt %, 19-40 wt %, or 20-40 wt %.

The at least one monomer and/or oligomer present in the curable coating composition are preferably polymerizable. Also, they may be soluble in the plasticizer at ambient temperatures. The at least one monomer and/or oligomer may be selected from acrylate monomers and acrylate oligomers. Acrylate oligomers may be selected from the group consisting of epoxy acrylates, polyester acrylates, urethane acrylates, silicone acrylates, amine functional polyether acrylate, chlorinated acrylates, and any combination thereof. Preferably urethane acrylate oligomer, such as urethane acrylate with ethoxylated trimethylol propane triacrylate, or urethane acrylate with 2-(2-ethoxyethoxy)ethyl acrylate. Monomers may be selected from the group consisting of ethoxylated phenol monoacrylate, tripropylene glycol diacrylate, trimethylpropane triacrylate, ethoxylated trimethylolpropane triacrylate, propoxylated glycerol triacrylate, epoxy acrylate, polyether acrylate, vinyl pyrrolidone, silicone acrylate, polyester acrylate, methacrylates, acrylic acid dimer, beta carboxyethyl acrylate, isobornyl acrylate, ocylacrylate, decylacrylate, aliphatic acrylates, pentaerithritol acrylates, 1,6-hexanediol acrylate, polyethylene diacrylate, and any combination thereof.

Monomer and/or oligomer may be present in the curable coating composition in an amount of 1-40 wt %, such as 1-25 wt %, 2-24 wt %, 4-22 wt %, 5-20 wt %, or 5-15 wt %.

The initiator which may be present in the curable coating composition may be selected from photoinitiators, and thermal initiators. Photoinitiators may include cationic polymerization initiators such as diaryldiiodonium or triarylsulphonium salts. Thermal initiators may include substituted benzylphosphonium salts.

Photoinitiators may be selected from the group consisting of benzophenone; acetophenone; o-methoxybenzophenone; acenapthene-quinone; methylethyl ketone; valerophenone; hexanophenone; alpha-phenylbutyrophenone; p-morpholinopropionphenone; dibenzosuberone; 4-morpholinobenzophenone; 4'-morpholinodeoxybenzoin; p-diacetylbenzene; 4-aminobenzophenone; 4'-methoxyacetophenone; benzaldehyde; alpha-tetralone; 9-acetylphenanthrene; 2-acetylphenanthrene; 10-thioxanthenone; 3-acetylphenanthrene; 3-acetylindone; 9-fluorenone; 1-indanone; 1,3,5-triacetylbenzene; thioxanthen-9-one; xanthrene-9-one; 7-H-benz[de]anthracen-7-one; 1-naphthaldehyde; 4,4'-bis(dimethylamino)benzophenone; fluorene-9-one; 1'-acetonaphthone; 2'-acetonaphthone; 2,3-butanedione; triphenylphosphine; tri-o-tolylphosphine; acetonaphthone; benz[A]anthracene-7,12-dione; benzoin alkyl ethers, such as benzoin methyl ether, benzoin ethyl ether, benzoin isopropyl ether or benzoin isobutyl ether; dialkoxyacetophenones, such as 2,2-dimethoxy-2-phenylacetophenone, or 2,2-diethoxy-2-phenylacetophenone; 2-hydroxy-2-methyl-1-phenyl-propan-1-one; benzildimethylketal; and any combination thereof.

Thermal initiators may be selected from the group consisting of substituted or unsubstituted pinacols, azo compounds, thiurams, organic peroxides, and any combination thereof. Preferably organic peroxides may be used as thermal initiator. It is even more preferable that the peroxides are blocked peroxides. Examples of organic peroxides are 2,5-dimethyl-2,5-di(t-butylperoxy)hexane, 1,3-bis(t-butylperoxyisopropyl)benzene, 1,3-bis(cumylperoxyisopropyl)benzene, 2,4-dichlorobenzoyl peroxide, caprylyl peroxide, lauroyl peroxide, t-butyl peroxyisobutyrate, benzoyl peroxide, p-chlorobenzoyl peroxide, hydroxyheptyl peroxide, di-t-butyl diperphthalate, t-butyl peracetate, t-butyl perbenzoate, dicumyl peroxide, 1,1-di(t-butylperoxy)-3,3,5-trimethylcyclohexane, and di-t-butyl peroxide. Examples of azo compounds 2-t-butylazo-2-cyanopropane; 2,2'-azobis-(2,4-dimethyl-4-methoxy-valeronitrile); 2,2'-azobis-(isobutyronitrile); 2,2'-azobis(2,4-dimethylvaleronitrile), and 1,1'-azobis(cyclohexanecarbonitrile). Examples of thiurams are tetramethylthiuram disulfide, tetraethylthiuram disulfide, di-N-pentamethylenethiuram disulfide, tetrabutylthiuram disulfide, diphenyldimethylthiuram disulfide, diphenyldiethylthiuram disulfide, and diethyleneoxythiuram disulfide. Examples of pinacols are benzopinacol, 4,4'-dichlorobenzopinacol, 4,4'-dibromobenzopinacol, 4,4'-diiodobenzopinacol, 4,4',4",4"'-tetrachlorobenzopinacol, 2,4-2',4'-tetrachlorobenzopinacol, 4,4'-dimethylbenzopinacol, 3,3'-dimethylbenzopinacol, 2,2'-dimethylbenzopinacol, 3,4-3',4'-tetramethylbenzopinacol, 4,4'-dimethoxybenzopinacol, 4,4', 4",4"'-tetramethoxybenzopinacol, 4,4'-diphenylbenzopinacol, 4,4'-dichloro-4",4"'-dimethylbenzopinacol, 4,4'-dimethyl-4",4"'-diphenylbenzopinacol, xanthonpinacol, fluorenonepinacol, acetophenonepinacol, 4,4'-dimethylacetophenone-pinacol, 4,4'-dichloroacetophenonepinacol, 1,1, 2-triphenyl-propane-1,2-diol, 1,2,3,4-tetraphenylbutane-2, 3-diol, 1,2-diphenylcyclobutane-1,2-diol, propiophenonepinacol, 4,4'-dimethylpropiophenone-pinacol, 2,2'-ethyl-3, 3'-dimethoxypropiophenone-pinacol, 1,1,1,4,4,4-hexafluoro-2,3-diphenyl-butane-2,3-diol, benzopinacol-mono methylether, benzopinacol-mono-phenylether, benzopinacol and monoisopropyl ether, benzopinacol monoisobutyl ether, and benzopinacol mono(diethoxy methyl)ether.

The initiator may be present in the curable coating composition in an amount of 0.5-5 wt %, such as 0.8-4 wt %, 1-3.5 wt %, or 1-3 wt %.

The pigments and dyes which may be present in the curable coating composition may be selected from titanium oxide, red iron oxide, black iron oxide, and carbon black, which pigments and dyes preferably are transparent to UV radiation etc. If they are used as filler only, it may be desirable to have very small particle sizes for the materials as that would minimize the reduced transparency of a coating or layer containing such.

Dyes and/or pigments may be present in the curable coating composition in an amount of 0.5-20 wt %, such as 1-15 wt %, or 1-10 wt %.

The stabilizers which may be present in the curable coating composition may be selected from metal containing stabilizers. Calcium and/or zinc containing stabilizers may be used.

Stabilizers may be present in the curable coating composition in an amount of 0.5-5 wt %, such as 1-4 wt %, or 1.5-3 wt %.

Fillers suitable which may be present in the curable coating composition may be selected from the group clay, such as bentonite, which may be modified or unmodified; calcium carbonate, such as heavy-duty calcium carbonate, precipitated calcium carbonate, surface treated calcium carbonate, etc.; magnesium carbonate; titanium oxide; barium sulfate; zinc white; silicic acid; mica powder talc; silica; diatomaceous earth; glass powder; graphite powder; alumina; metal powder; talc; and the like.

Fillers may be present in the curable coating composition in an amount of 0.5-5 wt %, such as 1-4 wt % or 1-3 wt %.

A further layer of a final product may be made of a printing ink.

The printing ink may comprise:
30-60 wt % monomer(s),
10-35 wt % dye(s) and/or pigment(s),
5-25 wt % prepolymer(s),
1-15 wt % resin(s),
1-10 wt % initiator(s), and
1-10 wt % other additives.

The monomer of the printing ink may be selected from the same types as mentioned for the curable coating composition. The monomer may be selected from acrylic ester monomers. The monomer may be present in the printing ink in an amount of 30-60 wt %, such as 35-55 wt %, or 40-50 wt %.

The dyes and/or pigments of the printing ink may be selected from the same types as mentioned for the curable coating composition. The dyes and/or pigments may be present in the printing ink in an amount of 10-35 wt %, such as 15-30 wt %, or 20-25 wt %.

The prepolymer of the printing ink may be selected from diallyl phthalate prepolymer. The unsaturated prepolymer polymerizes upon initiation of the crosslinking and becomes incorporated in the polymer network. The prepolymer may be present in the printing ink in an amount of 5-25 wt %, such as 10-20 wt %, or 12-18 wt %.

The resin of the printing ink may be selected from polyester resins. The resin may be present in the printing ink in an amount of 1-15 wt %, such as 3-10 wt %, or 5-8 wt %.

The initiator of the printing ink may be selected from photoinitiators, and thermal initiators. Preferably a mixture of photoinitiators is used, such as 2 or 3 different initiators. The initiator may be present in the printing ink in an amount of 1-10 wt %, such as 2-8 wt %, or 4-7 wt %.

The additives of the printing ink may be selected from stabilizers, fillers etc. The additives may be present in the printing ink in an amount of 1-10 wt %, such as 2-8 wt %, or 4-6 wt %.

A further layer of a final product may be made of an adhesive, preferably a pressure sensitive adhesive (PSA). The adhesive may comprise:
30-95 wt % copolymer(s),
0.5-15 wt % propylene glycol,
1-50 wt % solvent(s),
1-15 wt % silicon dioxide, and
10-50 wt % rosin.

The copolymer of the adhesive may be selected from copolymers of vinylacetate, ethylene, and acrylate. The copolymer may be present in the adhesive in an amount of 30-95 wt %, such as 40-90 wt %, 45-85 wt %, 40-70 wt %, 40-65 wt %, or 60-90 wt %.

The propylene glycol of the adhesive may be present in the adhesive in an amount of 0.5-15 wt %, such as 1-10 wt %, or 2-8 wt %.

The solvent of the adhesive may be selected from water, and hydrocarbon solvents, such as mineral spirit type hydrocarbon solvent, e.g. D40 solvent. The solvent may be present in the adhesive in an amount of 1-50 wt %, such as 2-45 wt %. The amount of solvent present may vary with type of solvent used. For example, if water is used, it may be present in an amount of 5-50 wt %, such as 10-45 wt %; and if a hydrocarbon solvent is used, it may be present in an amount of 1-10 wt %, such as 1-5 wt %, or 2-5 wt %.

The silicon dioxide of the adhesive may be present in the adhesive in an amount of 1-15 wt %, such as 1-10 wt %, or 2-8 wt %. The silicon dioxide is used as a rheology modifier herein.

The rosin of the adhesive may be present in the adhesive in an amount of 10-50 wt %, such as 20-40 wt %, or 25-35 wt %.

Alternatively, the adhesive may be a UV pressure sensitive permanent-tack adhesive which may comprise:
20-65 wt % urethane acrylate(s), preferably aliphatic urethane acrylate(s)
1-30 wt % alkyl acrylate(s), preferably 2-ethylexyl acrylate,
1-30 wt % hydrogenated hydrocarbon resin(s),
1-15 wt % reactive monomer diluent(s), preferably isobornyl acrylate
1-15 wt % vinyl amide monomer(s), preferably vinylcaprolactam
1-15 wt % silica, preferably amorphous silica
0.1-5 wt % UV photoinitiator(s).

From the description above follows that, although various embodiments of the invention have been described and shown, the invention is not restricted thereto, but may also be embodied in other ways within the scope of the subject-matter defined in the following claims.

The examples provided herein are not to be considered limiting for the invention but are provided as optional embodiments thereof.

NUMBERED EMBODIMENTS

The application can be described further with respect to the following numbered embodiments:

Method Embodiment 1

A method of producing a multilayered printed indicia or stencil, comprising the steps of: (A) providing a release coating on a substrate; (Ao) optionally providing a printing ink layer onto said release coating; (B) providing a coating of a curable composition comprising a polymer powder, at least one plasticizer, and at least one monomer and/or oligomer, onto the substrate or a thereon previously applied layer or coating; (C) heating the curable coating composition to a temperature of 70-120° C., preferably 70-110° C., preferably 75-100° C., more preferably 80-90° C., to provide a gelled curable coating; (Co) optionally providing a printing ink layer onto said gelled polymer coating, (D) providing a coating of another curable composition (which can have the same composition as the first or a different composition) comprising a polymer powder, at least one plasticizer, and at least one monomer and/or oligomer, onto the previously applied layer or coating; (E) heating the other curable coating composition to a temperature of 70-120° C., preferably 70-110° C., preferably 75-100° C., more preferably 80-90° C., to provide second gelled curable coating; (F) before crosslinking is performed, the multilayer-coated substrate formed is heated to a temperature of 130-160° C., preferably 140-160° C.; and (G) crosslinking the heated multilayer-coated substrate, by irradiation and/or subjection to heat at a temperature of 165-190° C., preferably 170-180° C.; (Go) wherein optionally a pressure sensitive adhesive composition coating is provided to the release coating on the substrate before further coatings are applied, or is provided to the gelled polymer coating which was last formed, if more than one is present.

Method Embodiment 2

The method according to a Method Embodiment, wherein the substrate have a surface tension in the range of 5 to 45 Dyne/cm, preferably 10-40, 15-35, or 12-38 Dyne/cm.

Method Embodiment 3

The method according to a Method Embodiment, wherein the second gelled polymer coating is provided with a coating of yet another polymer powder containing curable coating composition, which is heated to a temperature of 70-120° C., preferably 70-110° C., preferably, 75-100° C., more preferably 80-90° C., to provide a third gelled curable coating before crosslinking is performed.

Method Embodiment 4

The method according to a Method Embodiment, wherein said curable composition(s) comprises: 30-75 wt % polymer powder; 5-50 wt % plasticizer; 1-40 wt % monomer and/or oligomer; and 0.5-5 wt % initiator.

Method Embodiment 5

The method according to a Method Embodiment, wherein said polymer powder comprises acrylate polymers and/or vinyl polymers, preferably selected from the group consisting of polyvinyl chloride, polyvinyl acetate, copolymers of vinyl chloride and vinyl acetate, and homopolymers and/or copolymers of $C_{3-25}$ alkyl acrylates and/or $C_{2-25}$ alkyl methacrylates.

Method Embodiment 6

The method according to a Method Embodiment, wherein said plasticizer is phthalate free; preferably selected from the group consisting of polyglycol benzoate, trimellitate, pyromellitic acid ester, phosphates, adipates, sebacates, alkyl-substituted diphenyl, alkyl-substituted terphenyl, partially hydrogenated alkyl terphenyl, and any combination thereof

Method Embodiment 7

The method according to a Method Embodiment, wherein said monomer and/or oligomer is selected from acrylate monomers and acrylate oligomers, respectively.

Method Embodiment 8

The method according to a Method Embodiment, wherein said initiator is selected from photoinitiators, and thermal initiators, preferably selected from the group consisting of benzophenone, acetophenone, o-methoxybenzophenone, pinacols, azo compounds, thiurams, organic peroxides, and any combination thereof.

Method Embodiment 9

The method according to Embodiment 4, wherein said curable composition(s) further comprises: 0.5-20 wt % dyes and/or pigments; 0.5-5 wt % stabilizers; and 0.5-5 wt % fillers.

Method Embodiment 10

The method according to Embodiment 9, comprising at least one of: the dyes and/or pigments are selected from the group consisting of titanium oxide, red iron oxide, black iron oxide, and carbon black; the stabilizers are selected from the group consisting of metal containing stabilizers, preferably calcium and/or zinc containing stabilizers; and the fillers are selected from the group consisting of clays, calcium carbonate, magnesium carbonate, titanium oxide, barium sulfate, zinc white, silicic acid, mica powder talc, silica, diatomaceous earth, glass powder, graphite powder, alumina, metal powder, and talc.

Method Embodiment 11

The method according to a Method Embodiment, wherein when the pressure sensitive adhesive composition coating is provided to the gelled polymer coating which was last formed, the pressure sensitive adhesive composition coating is after the curing provided with a protective substrate, preferably a protective paper.

Method Embodiment 12

The method according to Embodiment 10 or 11, wherein the pressure sensitive adhesive composition comprises: (I) 30-95 wt % copolymer(s); 0.5-15 wt % propylene glycol; 1-50 wt % solvent(s); 1-15 wt % silicon dioxide; and 10-50 wt % rosin; or (II) 20-65 wt % urethane acrylate(s), preferably aliphatic urethane acrylate(s); 1-30 wt % alkyl acrylate(s), preferably 2-ethylexyl acrylate; 1-30 wt % hydrogenated hydrocarbon resin(s); 1-15 wt % reactive monomer diluent(s), preferably isobornyl acrylate; 1-15 wt % vinyl amide monomer(s), preferably vinylcaprolactam; 1-15 wt % silica, preferably amorphous silica; and 0.1-5 wt % UV photoinitiator(s).

Method Embodiment 13

The method according to a Method Embodiment, wherein the heating to provide a gelled curable coating is performed for a time period of 10 seconds to 2 minutes, preferably 20-60 seconds.

Method Embodiment 14

The method according to a Method Embodiment, wherein the crosslinking of the gelled polymer coating(s) is performed for a time period of 10 seconds to 2 minutes, preferably 20-60 seconds.

Product Embodiment 1

A multilayered printed indicia or stencil obtained according to the method of a Method Embodiment.

Miscellaneous

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4, . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more. If there are two ranges mentioned, such as about 1 to 10 and about 2 to 5, those of skill will recognize that the implied ranges of 1 to 5 and 2 to 10 are within the invention. All ranges recited in this specification, including the Numbered Embodiments, can be from about the starting parameter to about the ending parameter.

Where a sentence states that its subject is found in embodiments, or in certain embodiments, or in the like, it is applicable to any embodiment in which the subject matter can be logically applied.

This invention described herein is of a method of making multilayered printed indicia or stencil and products of the same. Although some embodiments have been discussed above, other implementations and applications are also within the scope of the following claims. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims. More specifically, those of skill will recognize that any embodiment described herein that those of skill would recognize could advantageously have a sub-feature of another embodiment, is described as having that sub-feature Publications and references, including but not limited to patents and patent applications, cited in this specification are herein incorporated by reference in their entirety in the entire portion cited as if each individual publication or reference were specifically and individually indicated to be incorporated by reference herein as being fully set forth. Any patent application to which this application claims priority is also incorporated by reference herein in the manner described above for publications and references. Filed concurrently herewith is an application made at the Swedish Patent Office under the same title (SE 1850930), the content of this application is incorporated herein in its entirety.

Example 1: Decorative Wall Transfer UV Offset/Hybrid or Screen Printed

A polyethylene terephthalate or polyoxythylene oxyterephthaloyl film of 50 or 75 μm thickness carrier was treated with a surface energy modifying release matt coating of polydimethylsiloxane including control release additive vinyl groups to enable printing and avoiding accidental ink release, the film was temperature stabilized and cured at a temperature of 140-150° C. The wall transfer full color halftone graphics were printed in a thickness between 1 to 2 μm with the formulations on a matt modified release coating. The plasticizers used are phthalate free.

Formulation 1.0—UV Offset Full Color Halftone Printing Ink:

| acrylic ester monomer | 42 parts |
| *pigments | 25 parts |
| diallylphtalate prepolymer | 15 parts |
| polyester resin | 7 parts |
| UV photoinitiators | 6 parts |
| additives | 5 parts |

*Cyan PB 15:2, Magenta PR 122, Yellow PY 12, Black 7

The multi color printed sheet was partially UV cured rendering tack-free to the touch. A second white pigmented 12-15 μm film forming 1.3 layer was screen printed on the halftone graphic images.

Formulation 1.1—Hybrid Offset Full Color Halftone Printing Ink:

In this example the sheetfed UV offset ink printed on the matt release sheet is exchanged for a UV hybrid ink from TOKA, a Japanese ink company. The hybrid inks are an intermediate form between UV and conventional offset inks. They contain a portion of monomers/oligomers as well conventional oil based offset ink resulting a improved adhesion to the 1.3. white screen printed ink indicia and the transparent layer 1,4 if selected. Layers were individually heated to ca 80-100° C. in order to swell the polymer particles by the plasticizer/monomer/oligomer composition and render it tack-free to the touch.

Formulation 1.2—Sol-Gel Acrylate Full Color Halftone Screen Printable Curable Composition Comprising a Polymer Powder:

For improved mechanical strength and color density optionally wall transfer full color halftones graphics can be screen-printed at a thickness between 3 to 4 μm. The plasticizers used are phthalate free.

| acrylate polymer powder | 43 parts |
| plasticizer | 32 parts |
| secondary plasticizer | 7 parts |
| *full color pigments | 6 parts |
| acrylate monomer | 5 parts |
| urethane acrylate oligomers | 3 parts |
| modified bentonite clay | 2 parts |
| silicon dioxide | 1 part |
| UV photoinitiators | 1 part |

*Cyan PB 15:2, Magenta PR 122, Yellow PY 12, Black 7

The printed carrier sheet was heated up to ca 80-100° C. in order to swell the polymer particles by the plasticizer/monomer/oligomer composition and render it tack-free to the touch.

Formulation 1.3—Sol-Gel Acrylate White Screen Printable Curable Composition Comprising a Polymer Powder:

| acrylate polymer powder | 48 parts |
| plasticizer | 25 parts |
| pigment white PW2* | 12 parts |
| urethane acrylate oligomers | 5 parts |
| secondary plasticizer | 5 parts |
| acrylate monomer | 4 parts |
| UV photoinitiators | 1 part |

*Titanium (IV) Oxide Rutile

The printed carrier sheet was heated up to ca 80-100° C. in order to swell the polymer particles by the plasticizer/monomer/oligomer composition and render it tack-free to the touch. Optionally a transparent Sol Gel Layer was prepared having the following formulation and subsequently printed over the indica to reinforce the mechanical strength.

Formulation 1.4—Sol-Gel Acrylate Transparent Printable Curable Composition Comprising a Polymer Powder:

| | |
|---|---|
| acrylate polymer powder | 49 parts |
| plasticizer | 31 parts |
| secondary plasticizer | 7 parts |
| acrylate monomer | 8 parts |
| amorphous fumed silica | 2 parts |
| Ca/Zn thermal stabilizer | 2 parts |
| UV photoinitiators | 1 part |

The printed carrier sheet was heated up to ca 80-100° C. in order to swell the polymer particles by the plasticizer/monomer/oligomer composition and render it tack free to the touch. A pressure sensitive adhesive was prepared having the following formulation.

Formulation 1.5—Pressure Sensitive Adhesive Medium-Tack:

| | |
|---|---|
| vinyl acetate, ethylene and acrylate copolymer | 90 parts |
| mono propylene glycol | 7 parts |
| solvent D40 | 2 parts |
| silicon dioxide | 1 part |

Subsequently the sheet was printed with a pressure sensitive 7-10 μm adhesive and oven-dried, thereafter the temperature was further increased to ca 140-150° C., and directly after that exposed to UV light in order to crosslink the sol-gel layers of monomer/oligomer mixture including the adhesive. A silicone coated liner paper for protection was laminated to the adhesive side. The multilayer indicia could be transferred to all types of materials, wall coverings and painted surfaces, the transferred indicia showed excellent adhesion and dimensional stability especially the edges of the indicia stayed well adhered without any curling.

FIG. 1 discloses an example of a Decorative wall transfer. The compositions disclosed here in Example 1 have been included in FIG. 1 for better understanding of the present multilayered printed indicia or stencil.

In FIG. 1 is disclosed:
1. Gloss Polyethylene terephthalate Carrier foil
2. Matt Polydimethylsiloxane Release Coating
3. *Full Color and Single Color Graphic Layers
Layers: Formulations, 1.0-1.1-1.2
4. White Sol Gel: Layer, Formulation: 1.3
5. Transparent: Sol Gel Layer, Formulation: 1.4
6. PSA Layer Formulation, 1.5
7. Protective Liner Paper
* UV Offset/Hybrid and Screen printing ink different coating layers are disclosed.

Example 2: Weather Resistant Sign Transfer

A polyethylene terephthalate or polyoxythylene oxyterephthaloyl film of 50 or 75 μm thickness carrier was treated with a surface energy modifying gloss release coating of polydimethylsiloxane including control release additive vinyl groups to enable printing and avoiding accidental ink release, the film was temperature stabilized and cured at a temperatures of 160-170° C. At the following formulations the photo initiator of the sol gel are exchanged for an organic peroxide with an activation temperature of ca 170° C. It may be preferable to use acrylate polymer powders in formulations for improved outdoor weather and UV resistance. The plasticizers used are phthalate free.

A transparent 4-7 μm film forming layer was screen printed of the following formulation containing UV filters and stabilisers.

Formulation 2.0—Sol-Gel Acrylate Transparent Screen Printable Curable Composition Comprising a Polymer Powder:

| | |
|---|---|
| acrylate polymer powder | 49 parts |
| plasticizer | 26 parts |
| acrylate monomer | 12 parts |
| secondary plasticizer | 7 parts |
| peroxide | 3 parts |
| Ca/Zn thermal stabilizer | 2 parts |
| silicon dioxide | 0.5 part |
| UV/UVA absorber | 0.5 part |

The layer was heated up to ca 80-100° C. in order to swell the polymer particles by the plasticizer/monomer/oligomer composition and render it tack-free to the touch.

A pigmented 8-12 μm ink layer was screen printed of the following formulation.

Formulation 2.1—Sol-Gel Acrylate Black Screen Printable Curable Composition Comprising a Polymer Powder:

| | |
|---|---|
| acrylate polymer powder | 46 parts |
| plasticizer | 25 parts |
| acrylate monomer | 12 parts |
| secondary plasticizer | 9 parts |
| pigment carbon *C.I. Black 7 | 4 parts |
| peroxide | 3 parts |
| silicon dioxide | 1 part |

* Optional selection of Pigments

This sign transfer is pigmented with low UV Light penetrable pigmentation for example using dense carbon black or other UV and weather resistant pigments above wool-scale 8 indicia pigmentation, requiring a protective UV light absorber to improve the weathering and UV resistance. Gelling of all sol gel layers is required. Due to the pigmentation herein a limited penetration depth of UV radiation to the filtered or opaque ink layers would be obtained which leads to lack of crosslinking in all layers. In order to avoid uncured material an organic peroxide with an activation temperature above 160° C. was introduced in the formulation. Curing the individual sol-gel layers to one coherent film was performed at 170° C.-180° C. Including an high tack resistant pressure sensitive water based or high solid UV adhesive of the following formulations.

Formulation 2.2—Waterborne Pressure Sensitive Adhesive High-Tack:

| | |
|---|---|
| water | 40 parts |
| vinyl acetate, ethylene and acrylate copolymer | 38 parts |
| rosin | 15 parts |
| solvent D40 | 6 parts |
| mono propylene glycol | 1 part |

Alternatively UV permanent-tack adhesive may be used:

Formulation 2.3—UV Pressure Sensitive Permanent-Tack Adhesive:

| | |
|---|---|
| alipatic uretane acrylate | 47 parts |
| 2-ethylexyl acrylate | 20 parts |

-continued

| | |
|---|---|
| hydrogenated hydrocarbon resin | 18 parts |
| isobornyl acrylate | 7 parts |
| vinylcaprolactam | 5 parts |
| amorphous silica | 2 part |
| UV photoinitiators mix | 1 part |

The sheet was subsequently printed with the selected type of pressure sensitive, formulation 2.2 high-tack printed at 7-10 μm or selecting the UV permanent-tack formulation 2.3 printed at 10-12 μm thickness the temperature was further increased to ca 160-170° C., in order to crosslink the sol-gel layers of monomer/oligomer mixture directly followed by UV exposure in order to crosslink the UV adhesive. A silicone coated liner paper for protection was laminated to the adhesive side. The multilayer decal could be transferred to all types of materials and objects.

FIG. 2 discloses an example of a weather resistant sign transfer. The compositions disclosed here in Example 2 have been included in FIG. 2 for better understanding of the present multilayered printed indicia or stencil. In FIG. 2 two different options for PSA layers are disclosed.

In FIG. 2 is disclosed:
1. Gloss Polyethylene terephthalate Carrier foil
2. Polydimethylsiloxane Release Coating
3. Transparent Film Forming layer, Formulation: 2.0
4 *Vector Color Image Layers, Formulation: 2.1
5. WB PSA Layer, Formulation: 2.2 (left part of FIG. 2)
6 UV PSA Layer, Formulation: 2.3 (right part FIG. 2)
7. Protective Liner Paper
* Screen-printed >wool scale 8 resistant.

Example 3: Peel-Off Decal Graphics

A polyethylene terephthalate or polyoxythylene oxyterephthaloyl film of 50 or 75 μm thickness carrier was treated with a surface energy modifying release coating of polydimethylsiloxane including control release additive vinyl groups. The film was temperature stabilized and cured at a temperatures of 160-170° C. The peel-off decal was first printed with a pressure sensitive adhesive 3.0 and protect printed by a transparent 3.1 film former ink and subsequently full color including white image printed with 3.2 UV or hybrid 1.1 Offset inks and cover printed with 3.3 and 3D 3.4 sol gel varnish layers.

An pressure sensitive adhesive was prepared with the following formulation.

Formulation 3.0—Pressure Sensitive Repositionable Adhesive:

| | |
|---|---|
| water | 44 parts |
| vinyl acetate, ethylene and acrylate copolymer | 46 parts |
| coarse grained silicon dioxide | 5 parts |
| silicon dioxide | 2 parts |
| mono propylene glycol | 3 parts |

The carrier sheet was printed with a pressure sensitive 4-7 μm adhesive and oven-dried at about 70-80° C. The following film forming transparent layer was prepared of the following formulation. The plasticizers used are phthalate free.

Formulation 3.1—Sol-Gel Vinyl Transparent Screen Printable Curable Composition Comprising a Polymer Powder:

| | |
|---|---|
| polymer vinyl powder | 60 parts |
| plasticizer | 24 parts |
| acrylate monomer | 6 parts |
| secondary plasticizer | 4 parts |
| organic peroxide | 3 parts |
| acrylate urethane oligomer | 3 parts |
| Ca/Zn thermal stabilizer | 2 parts |

The printed sheet was heated up to about 100-110° C. In order to swell the polymer particles by the plasticizer/monomer/oligomer composition and render it tack-free to the touch and prepared to be UV or hybrid offset printed on the white or transparent indicia of the fowling formulation.

Formulation 3.2—UV Offset Full Color Halftone and White Printing Ink:

| | |
|---|---|
| acrylic ester monomer | 42 parts |
| *pigments | 25 parts |
| diallylphtalate prepolymer | 15 parts |
| polyester resin | 7 parts |
| UV photoinitiator mix | 6 parts |
| additives | 5 parts |

*Cyan PB 15:2, Magenta PR 122, Yellow PY 12, Black 7, White PW 2

The printed UV Offset or hybrid inks where cured rendering tack free to the touch. Subsequently the sol gel varnish layers were prepared having the following formulations. The plasticizers used are phthalate free.

Formulation 3.3—Sol-Gel Vinyl Transparent Screen Printable Curable Varnish Composition Comprising a Polymer Powder:

| | |
|---|---|
| polymer vinyl powder | 57 parts |
| plasticizer | 14 parts |
| acrylate urethane oligomer | 20 parts |
| secondary plasticizer | 5 parts |
| Ca/Zn stabilizer | 2 parts |
| Acrylate monomer | 1 part |
| UV photoinitiator mix | 1 part |

The printed sheet was heated up to about 100-110° C. in order to swell the polymer particles by the plasticizer/monomer/oligomer composition and render it tack-free to the touch. The second 3D sol-gel varnish layer was prepared having the following formulations. The plasticizers used are phthalate free.

Formulation 3.4—Sol-Gel Vinyl Transparent 3D Screen Printable Curable Varnish Composition Comprising a Polymer Powder:

| | |
|---|---|
| polymer vinyl powder | 66 parts |
| plasticizer | 15 parts |
| acrylate monomer | 10 parts |
| secondary plasticizer | 6 parts |
| Ca/Zn Stabilizer | 2 parts |
| UV photoinitiator mix | 1 part |

The multilayered indicia decal was heated to about 160-170° C., and directly after that exposed to UV light in order to crosslink the sol-gel layers of polymer and monomer/oligomer mixtures, including the adhesive. The multilayer 3D indicia decal could be peeled-off and adhered to all types of materials and surfaces. The decal showed good adhesion and dimensional stability without any shrinking.

FIG. 3 discloses an example of peel-off decal graphics. The compositions disclosed here in Example 3 have been included in FIG. 3 for better understanding of the present multilayered printed indicia or stencil.

In FIG. 3 is disclosed:
1. Gloss Polyethylene terephthalate Carrier foil
2. Polydimethylsiloxane Release Coating
3. WB PSA Layer, Formulation: 3.0
4. Transparent Film Forming layer, Formulation: 3.1
5 *Single/Full Color Graphic Layer, Formulation: 3.2
6. Film Forming layer, Formulation: 3.3
7. Film Forming 3D layer, Formulation 3.4
*UV Offset or hybrid ink.

Example 4: Flexible Stencil Masks

A gloss polyethylene terephthalate or polyoxythylene oxyterephthaloyl film of 50 or 75 µm thickness carrier was treated with a surface energy modifying release coating of polydimethylsiloxane including control release additive vinyl groups. The film was temperature stabilized and cured at a temperatures of 160 to 170° C. The peel-off stencil was first printed with a pressure sensitive adhesive, and subsequently with a color mask, followed by one or more printed stencil masks whereby the last printed mask will be solvent resistant. A pressure sensitive adhesive was prepared with the following formulation.

Formulation 4.0—Pressure Sensitive Repositionable Adhesive:

| water | 44 parts |
| vinyl acetate, ethylene and acrylate copolymer | 43 parts |
| coarse grained silicon dioxide | 6 parts |
| silicon dioxide | 4 parts |
| mono propylene glycol | 3 parts |

The carrier sheet was printed with a pressure sensitive 4-7 µm adhesive and oven-dried at ca 70-80° C. The color stencil ink layer was prepared of the following formulation. The plasticizers used are phthalate free.

Formulation 4.1—Sol-Gel Vinyl Transparent Color Screen Printable Curable Composition Comprising a Polymer Powder:

| polymer vinyl powder | 65 parts |
| plasticizer | 21 parts |
| secondary plasticizer | 7 parts |
| acrylate monomer | 3 parts |
| Ca/Zn stabilizer | 2 parts |
| red pigment PR 122* | 1 part |
| UV photoinitiator mix | 1 part |

*Optional Pigment Red PR 122

The printed carrier sheet was heat gelled rendering tack-free to the touch. A second non-pigmented 60-80 µm stencil mask was screen printed on the color ink stencil layer of the following formulation. The plasticizers used are phthalate free.

Formulation 4.2—Sol Gel Vinyl Transparent Screen Printable Curable Composition Comprising a Polymer Powder Stencil Mask:

| polymer vinyl powder | 66 parts |
| plasticizer | 23 parts |
| secondary plasticizer | 5 parts |
| acrylate monomer | 3 parts |
| Ca/Zn stabilizer | 2 parts |
| UV photoinitiator mix | 1 part |

The printed carrier sheet was heat gelled rendering tack-free to the touch. A third non-pigmented 60-80 µm rigid stencil mask was screen printed of the following formulation. The plasticizers used are phthalate free.

Formulation 4.3—Sol-Gel Vinyl Rigid Screen Printable Curable Composition Comprising a Polymer Powder Stencil Mask:

| polymer vinyl powder | 65 parts |
| plasticiser | 18 parts |
| acrylate monomer | 10 parts |
| secondary plasticizer | 4 parts |
| Ca/Zn stabilizer | 2 parts |
| UV photoinitiator mix | 1 part |

The multilayered stencil masks where heated to ca 160-170° C. Thereafter, they were directly exposed to UV light in order to crosslink the sol-gel polymer and monomer mixture, including the adhesive. The stencil masks could be peeled from the carrier and applied to all types of materials and surfaces for decoration purposes, the stencil showed dimensional stability interlayer adhesion and solvent resistance to withstand cleaning for repeated multiple reuse.

FIG. 4 discloses an example of flexible stencil masks. The compositions disclosed here in Example 4 have been included in FIG. 4 for better understanding of the present multilayered printed indicia or stencil.

In FIG. 4 is disclosed:
1. Gloss Polyethylene terephthalate Carrier foil
2. Polydimethylsiloxane Release Coating
3. Repositionable WB PSA Layer, Formulation: 4.0
4. Transparent Color layer, Formulation: 4.1
5. Transparent Stencil Mask, Formulation: 4.2
6. Transparent rigid Stencil Mask, Formulation: 4.3
7. Stencil open design.

Example 5: Durable Stencil Masks

A glass fiber PFFE temporary carrier was used to print the stencil multi masking layers and removed after printing gelling and crosslinking, this type of carrier will be reused for the next production batch, the second option is for smaller stencil sizes to use a polyethylene terephthalate film treated with a surface energy modifying release coating and supply the sheet with the stencil mask. The carrier was printed with a color mask, followed by two or more printed stencil masks whereby the last printed mask will be durable and solvent resistant.

A transparent color layer was prepared with the following formulation.

Formulation 5.0—Sol-Gel Vinyl Transparent Color Screen Printable Curable Composition Comprising a Polymer Powder:

| polymer vinyl powder | 65 parts |
| plasticizer | 21 parts |
| secondary plasticizer | 7 parts |
| acrylate monomer | 3 parts |
| Ca/Zn stabilizer | 2 parts |
| red pigment PR 122* | 1 part |
| UV photoinitiator mix | 1 part |

*Optional Pigment Red PR 122

The printed carrier sheet was heat gelled rendering tack-free to the touch. A second non-pigmented 60-80 μm stencil mask was screen printed on the color ink stencil layer of the following formulation. The plasticizers used are phthalate free.

Formulation 5.1—Sol-Gel Vinyl Rigid Screen Printable Curable Composition Comprising a Polymer Powder Stencil Mask:

| | |
|---|---|
| polymer vinyl powder | 65 parts |
| plasticizer | 21 parts |
| acrylate monomer | 8 parts |
| secondary plasticizer | 3 parts |
| Ca/Zn stabilizer | 2 parts |
| UV photoinitiator mix | 1 part |

The color and transparent printed masks on the carrier sheet was heat gelled rendering tack-free to the touch. A third non-pigmented 70-90 μm stencil mask was screen printed on the previous stencil layers of the following formulation. The plasticizers used are phthalate free.

Formulation 5.2—Sol-Gel Vinyl Durable Screen Printable Curable Composition Comprising a Polymer Powder Stencil Mask:

| | |
|---|---|
| polymer vinyl powder | 60 parts |
| plasticizer | 21 parts |
| acrylate monomer | 9 parts |
| co-polyester powder | 5 parts |
| secondary plasticizer | 2 parts |
| Ca/Zn stabilizer | 2 parts |
| UV photoinitiator mix | 1 part |

The durable multilayered stencil masks where heated to ca 160-170° C. Thereafter, they were directly exposed to UV light in order to crosslink the sol-gel polymer and monomer mixture. The stencil masks were removed from the carrier and packed for distribution, the advantages compared to laser cut and die cut stencils is better artwork reproduction presenting finer details and better flexibility, they can be applied to all types of materials and surfaces for decoration purposes, the stencil showed optimum dimensional stability interlayer adhesion and solvent resistance to withstand cleaning for repeated multiple reuse.

FIG. 5 discloses an example of durable stencil masks. The compositions disclosed here in Example 5 have been included in FIG. 5 for better understanding of the present multilayered printed indicia or stencil.

In FIG. 5 is disclosed:
1. Glassfiber PTFE Carrier foil
2. Transparent Color layer, Formulation: 5.0
3. Transparent Stencil Mask, Formulation: 5.1
4. Transparent Durable Stencil Mask, Formulation: 5.2
5. Stencil open design.

The invention claimed is:
1. A method of producing a multilayered printed indicia or stencil with a process including a crosslinking step, comprising the steps of:
   providing a substrate with a polymeric release film forming a surface thereon;
   providing a coating of a curable composition comprising a polymer powder, at least one plasticizer, and at least one monomer and/or oligomer, onto the polymeric release film surface or a thereon previously applied layer or coating;
   heating the curable coating composition to a temperature of about 70° C. to about 120° C., to provide a gelled curable coating;
   providing a coating of another curable composition comprising a polymer powder, at least one plasticizer, and at least one monomer and/or oligomer, onto the previously applied layer or coating;
   heating the other curable coating composition to a temperature of about 70° C. to about 120° C., to provide second gelled curable coating;
   before crosslinking is performed, a multilayer-coated substrate formed by said providing and heating steps is further heated to a temperature of about 130° C. to about 160° C.; and
   performing the crosslinking on the heated multilayer-coated substrate, by irradiation and/or subjection to heat at a temperature of about 165° C. to about 190° C.,
   wherein, one or both said curable compositions is a curable composition A that comprises:
   40-about 68 wt % polymer powder,
   15-about 40 wt % plasticizer,
   about 1-25 wt % monomer and/or oligomer,
   about 0.5-about 5 wt % initiator.

2. The method according to claim 1, comprising providing a printing ink layer onto said polymeric release film surface and/or onto said gelled polymer coating.

3. The method according to claim 1, wherein a pressure sensitive adhesive composition coating is provided to the polymeric release film surface on the substrate before further coatings are applied, or is provided to the gelled polymer coating which was last formed, if more than one is present, wherein the pressure sensitive adhesive comprises one or the other of the following:
   PSA composition 1 comprising:
      about 30-about 95 wt % copolymer(s),
      about 0.5-about 15 wt % propylene glycol,
      about 1-about 50 wt % solvent(s),
      about 1-about 15 wt % silicon dioxide, and
      about 10-about 50 wt % rosin,
   or PSA composition 2 comprising:
      about 20-about 65 wt % urethane acrylate(s),
      about 1-about 30 wt % alkyl acrylate(s),
      about 1-about 30 wt % hydrogenated hydrocarbon resin(s),
      about 1-about 15 wt % reactive monomer diluent(s),
      about 1-about 15 wt % vinyl amide monomer(s),
      about 1-about 15 wt % silica, and
      about 0.1-about 5 wt % UV photoinitiator(s).

4. The method according to claim 3, wherein the pressure sensitive adhesive composition comprises PSA composition 1.

5. The method according to claim 3, wherein when the pressure sensitive adhesive composition coating is provided to the gelled polymer coating which was last formed, the pressure sensitive adhesive composition coating is after the curing provided with a protective substrate.

6. The method according to claim 3, wherein the pressure sensitive adhesive composition comprises PSA composition 2.

7. The method according to claim 3, wherein all applied structural layers of the printed indicia or stencil are polymeric films.

8. The method according to claim 1, wherein the polymeric release film surface has a surface tension in the range of about 5 to about 45 Dyne/cm.

9. The method according to claim 1, wherein the second gelled polymer coating is provided with a coating of yet another polymer powder containing curable coating composition, which is heated to a temperature of about 70 to about 120° C., to provide a third gelled curable coating before crosslinking is performed.

10. The method according to claim 1, wherein said curable curable composition A comprises:
about 0.5-3 wt % initiator.

11. The method according to claim 10, wherein said initiator is selected from photoinitiators, and thermal initiators selected from the group consisting of benzophenone, acetophenone, o-methoxybenzophenone, pinacols, azo compounds, thiurams, organic peroxides, and any combination thereof.

12. The method according to claim 10, wherein said curable composition A further comprises:
about 0.5-about 20 wt % dyes and/or pigments,
about 0.5-about 5 wt % stabilizers, and
about 0.5-about 5 wt % fillers.

13. The method according to claim 12, wherein curable composition A comprises at least one of:
the dyes and/or pigments are selected from the group consisting of titanium oxide, red iron oxide, black iron oxide, and carbon black;
the stabilizers are selected from the group consisting of metal containing stabilizers; and
the fillers are selected from the group consisting of clays, calcium carbonate, magnesium carbonate, titanium oxide, barium sulfate, zinc white, silicic acid, mica powder talc, silica, diatomaceous earth, glass powder, graphite powder, alumina, metal powder, and talc.

14. The method according to claim 1, wherein said polymer powder comprises acrylate polymers and/or vinyl polymers.

15. The method according to claim 14, wherein the acrylate and/or vinyl polymers are selected from the group consisting of polyvinyl chloride, polyvinyl acetate, copolymers of vinyl chloride and vinyl acetate, and homopolymers and/or copolymers of $C_{3-25}$ alkyl acrylates and/or $C_{2-25}$ alkyl methacrylates.

16. The method according to claim 14, wherein the plasticizer is selected from the group consisting of polyglycol benzoate, trimellitate, pyromellitic acid ester, phosphates, adipates, sebacates, alkyl-substituted diphenyl, alkyl-substituted terphenyl, partially hydrogenated alkyl terphenyl, and any combination thereof.

17. The method according to claim 1, wherein said plasticizer is phthalate free.

18. The method according to claim 1, wherein said monomer and/or oligomer is selected from acrylate monomers and acrylate oligomers, respectively.

19. The method according to claim 1, wherein the heating to provide a gelled curable coating is performed for a time period of about 10 seconds to about 2 minutes.

20. The method according to claim 1, wherein the crosslinking of the gelled polymer coating(s) is performed for a time period of about 10 seconds to about 2 minutes.

21. The method according to claim 1, wherein all applied structural layers printed indicia or stencil are polymeric films.

22. A multilayered printed indicia or stencil obtained according to the method of claim 1.

23. A method of producing a multilayered printed indicia or stencil with a process including a crosslinking step, comprising the steps of:
providing a substrate with a polymeric release film forming a surface thereon;
providing a coating of a curable composition comprising a polymer powder, at least one plasticizer, and at least one monomer and/or oligomer, onto the polymeric release film surface or a thereon previously applied layer or coating;
heating the curable coating composition to a first temperature effective to provide a gelled curable coating;
providing a coating of another curable composition comprising a polymer powder, at least one plasticizer, and at least one monomer and/or oligomer, onto the previously applied layer or coating;
heating the other curable coating composition to a second temperature, which can be the same as the first, effective to provide a second gelled curable coating;
before crosslinking is performed, a multilayer-coated substrate is formed by said providing and heating steps is further heated to a third temperature, higher than the first or second temperature, effective to dissolve polymer powder in the gelled curable coatings; and
performing the crosslinking on the heated multilayer-coated substrate, by irradiation and/or subjection to heat at a fourth temperature effective to effect crosslinking,
wherein, one or both said curable compositions comprise:
40-about 68 wt % of the polymer powder,
15-about 40 wt % plasticizer,
about 1-25 wt % monomer and/or oligomer, and
about 0.5-about 5 wt % initiator.

* * * * *